United States Patent [19]
Mizutome et al.

[11] Patent Number: 4,779,085
[45] Date of Patent: Oct. 18, 1988

[54] MATRIX DISPLAY PANEL HAVING ALTERNATING SCAN PULSES GENERATED WITHIN ONE FRAME SCAN PERIOD

[75] Inventors: Atsushi Mizutome, Kanagawa; Shinichi Yamashita, Atsugi; Hideo Sugano, Kawasaki; Hiroshi Inoue, Yokohama, all of Japan

[73] Assignee: Canon Kabushiki Kaisha, Tokyo, Japan

[21] Appl. No.: 900,612

[22] Filed: Aug. 26, 1986

[30] Foreign Application Priority Data

Aug. 29, 1985 [JP] Japan .................. 60-188487

[51] Int. Cl.$^4$ ........................... G09G 3/36
[52] U.S. Cl. .................. 340/805; 340/765; 340/784; 340/801
[58] Field of Search ........... 340/784, 805, 801, 782

[56] References Cited

U.S. PATENT DOCUMENTS 4,200,868  4/1980  Lamourex et al. .......... 340/805
4,236,154 11/1980  Lee ........................... 340/805
4,499,459  2/1985  Sasaki et al. ............... 340/752
4,513,282  4/1985  Nakagiri .................... 340/765
4,623,881 11/1986  Arnold ....................... 340/747

Primary Examiner—Howard A. Birmiel
Attorney, Agent, or Firm—Fitzpatrick, Cella, Harper & Scinto

[57] ABSTRACT

The specification and drawings relate to liquid crystal matrix display panel which is used to display a television image or the like and disclose the technology in which: the pixels on a matrix are divided into at least two groups of pixels, in particular, two right and left pixel groups; these pixel groups are respectively independently driven within one horizontal scanning interval; thereby widening the width of the vertical scanning signal and allowing the image signal to be sufficiently transferred to the liquid crystal cells; and thereby allowing a high-quality image to be displayed without causing a lack of luminance or a variation in luminance in association with the realization of a large area and a fine pitch of the display panel.

5 Claims, 2 Drawing Sheets

MATRIX DISPLAY PANEL HAVING ALTERNATING SCAN PULSES GENERATED WITHIN ONE FRAME SCAN PERIOD

BACKGROUND OF THE INVENTION

1. Field of the Invention

The present invention relates to a matrix display panel having a thin film transistor and, more particularly, to a liquid crystal matrix display panel to display a television image or the like.

2. Related Background Art

Hitherto, there has been proposed the display panel for displaying a multivalue image, for example, a television image by use of a high-density twodimensional matrix type liquid crystal panel (active matrix type liquid crystal panel) using thin film transistor (hereinafter, abbreviated to a TFT).

As a method of driving such a display panel, the image signal corresponding to all pixels in the horizontal direction is sampled and held within one horizontal scanning interval, and thereafter a vertical scanning signal (hereinafter, abbreviated to a gate pulse) is supplied to the gate line of the TFT, thereby allowing the image signal to be transferred to an equivalent capacitance of a liquid crystal cell and allowing the television image or the like to be displayed on the liquid crystal panel.

In the above-mentioned driving method, when the television signal is of the NTSC system, one horizontal scanning interval is 63.5 μsec and the interval (horizontal blanking interval) other than the image information in one horizontal scanning interval is about 11 μsec, so that the maximum width of the gate pulse of the TFT is limited to the value which is almost as long as the horizontal blanking interval. Therefore, in the case of this gate pulse width, the image signal cannot be sufficiently transferred to the liquid crystal cell due to variations in characteristics (particularly, ON resistance) of the TFT of the matrix substrate, so that a variation in luminance of the liquid crystal panel occurs. In recent years, the area of the panel enlarges more and more, the pitch of the panel becomes finer and finer, the dimension of the TFT is miniaturized, and the wiring pattern becomes fine, so that its impedance also increases. Consequently, in the case of the above gate pulse width, a sufficient charging rate into the equivalent capacitance of the liquid crystal cell can barely be obtained. Further, in order to narrow the amplitude of the image signal, the method whereby a voltage of the phase opposite to the image signal is applied to the opposite common electrodes has been also considered. However, in this case, it is necessary invert the common electrodes after the first gate pulse was applied, so that the condition concerned with the allowable time becomes severe. As described above, according to the liquid crystal display panel based on the conventional system, the lack of luminance and the variation in luminance are likely to occur, resulting in the deterioration in image quality in the recent panel of a large area and a high fine pitch.

SUMMARY OF THE INVENTION

It is an object of the present invention to provide a liquid crystal display panel having a high image quality in which even when the area of the panel is enlarged and the pitch of the panel is made fairly fine, the lack of luminance and the variation in luminance are not caused.

In a matrix display panel having an active matrix substrate which is driven by source and gate lines, the invention is characterized in that the pixels on the matrix are classified into at least two groups of pixels and each pixel group is respectively independently driven within one horizontal scanning interval.

DETAILED DESCRIPTION OF THE PREFERRED EMBODIMENTS

In a liquid crystal matrix display panel having an active matrix substrate which is driven by source and gate lines, the present invention is characterized in that the pixels on the matrix are classified into at least two groups of pixels, in particular, the pixels are divided into two right and left pixel groups, and each pixel group is respectively independently driven within one horizontal scanning interval. As a result the display panel is divided into the first and second pixel groups in the lateral direction, the gate lines are also divided into the forward part and the backward part. The divided pixel groups are respectively driven by independent driving circuits by way of he first and second gate lines and the first and second common electrodes.

According to the invention, the divided two pixel groups are independenly driven; therefore, it is sufficient to charge the liquid crystal cells of one pixel group for the horizontal scanning interval of the other pixel group. The width of the gate pulse can be widened to the time of about ½ of one horizontal scanning interval. By raising the charging rate of the liquid crystal cells, the image signal is efficiently transmitted to the liquid crystal cells, so that the lack of luminance and the variation in luminance due to a variation in characteristics of the TFT are not caused.

An embodiment of the present invention will now be described in detail hereinbelow.

Figure 1:
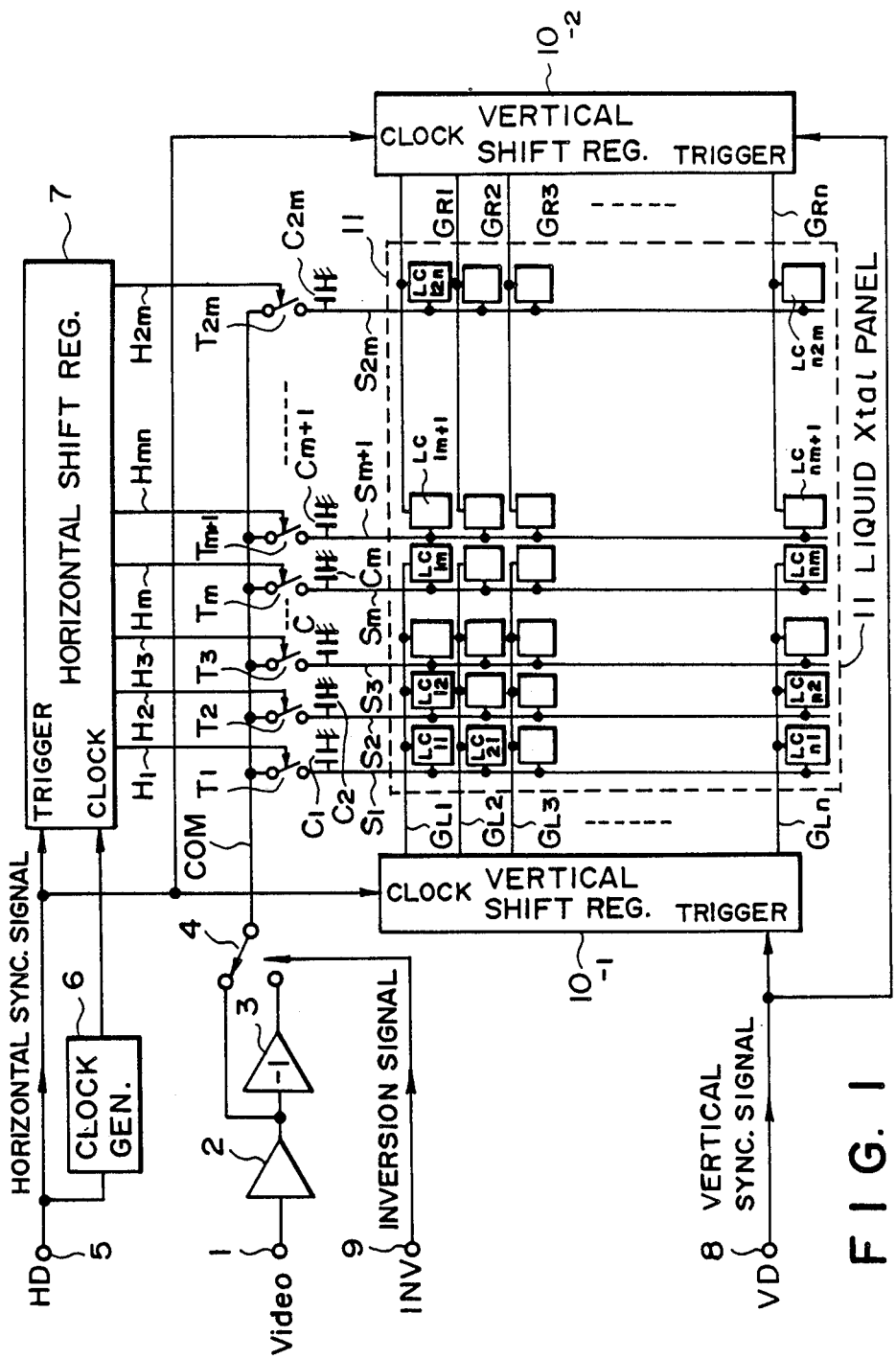
FIG. 1 is a constitutional diagram of an embodiment oF the present invention.

FIG. 1 is a diagram of a liquid crystal display panel according to the invention and its peripheral circuits. In FIG. 1, reference numeral 1 denotes an image signal input terminal; 2 is an amplifier; 3 an inverter; 4 a change-over switch; 5 a horizontal sync signal input terminal; 6 a clock generator; 7 a horizontal shift register; 8 a vertical sync signal input terminal; 9 an inversion signal input terminal; 10-1 and 10-2 first and second vertical shift registers; and 11 a liquid crystal panel. The liquid crystal panel 11 is the active matrix liquid crystal panel which is driven by source lines $S_1$ to $S_{2m}$ and gate lines $G_1$ to $G_n$. In the invention, a group of pixels are divided by half, a matrix is constituted by the source lines $S_1$ to $S_m$ and gate lines $G_{L1}$ to $G_{Ln}$ from the first vertical shift register 10-1, and another matrix is constituted by the remaining source lines $S_{m+1}$ to $S_{2m}$ and gate lines $G_{R1}$ to $G_{Rn}$ from the second vertical shift register 10-2.

The image signal is input from the image signal input terminal 1 and amplified by the amplifier 2. Thereafter, the amplified signal is directly transmitted to one terminal of the switch 4 and is also supplied to the inverter 3, by which it is inverted and sent to the other terminal of the switch 4. The switch 4 switches those two signal paths in accordance with the polarity of an INV (inversion) signal from the inversion signal input terminal 9 and is driven by an alternate current manner. An HD (horizontal sync signal) is input from the horizontal sync signal input terminal 5. When the clock generator 6 generates a clock which is almost 2m times as large as the HD signal, the horizontal shift register 7 generates sequential scanning pulses $H_1$ to $H_{2m}$ synchronized with the HD signal on the basis of both of the HD signal and the clock signal. The image signal to which the polarity was given by the switch 4 is distributed into capacitors $C_1$ to $C_{2m}$ by switches $T_1$ to $T_{2m}$ in response to the sequential scanning pulses $H_1$ to $H_{2m}$. The source lines $S_1$ to $S_{2m}$ are connected to the capacitors $C_1$ to $C_{2m}$, respectively. On the other hand, the HD signal is input as a clock to the vertical shift registers 10-1 and 10-2. These registers shift at the period of the HD signal and transmit the sequential scanning pulses synchronized with the VD signal (vertical sync signal) input from vertical sync signal input terminal 8 to the first gate lines $G_{L1}$ to $G_{Ln}$ and the second gate line $G_{R1}$ to $G_{Rn}$. Respective pixels $LC_{11}$ to $LC_{n \cdot 2m}$ of the liquid crystal panel 11 are arranged on the matrices by the source lines $S_1$ to $S_{2m}$ and the gate lines $G_{L1}$ to $G_{Ln}$ and $G_{R1}$ to $G_{Rn}$.

As described above, according to the invention, the gate line which has conventionally been formed by a single line is divided into the right and left parts. In addition, although not shown in FIG. 1, the common electrodes may be divided and taken out in correspondence to the gate lines in dependence on a driving method.

While, the horizontal shift register 7 sequentially samples and holds the image signal into the next capacitors $C_{m+1}$ to $C_{2m}$, a gate pulse is applied to one of the first gate lines $G_{L1}$ to $G_{Ln}$, and the data sampled and held in the capacitors $C_1$ to $C_m$ corresponding to the image signal of the first gate lines is transferred to the pixels $LC_{K1}$ to $LC_{Km}$ connected to the gate line $G_{LK}$ and then displayed. While the horizontal shift register 7 sequentially samples and holds the image signal of the next line into the capacitors $C_1$ to $C_m$, a gate pulse is applied to one of the second gate lines $G_{R1}$ to $G_{Rn}$, and the data sampled and held in the capacitors $C_{m+1}$ to $C_{2m}$ corresponding to the image signal of the second gate lines is subsequently transferred to the pixels $LC_{K \cdot m+1}$ to $LC_{K \cdot 2m}$ connected to the gate line $G_{RK}$ and then displayed. By repeating the foregoing cycle, a television image is displayed on the liquid crystal panel 11.

Figure 2:
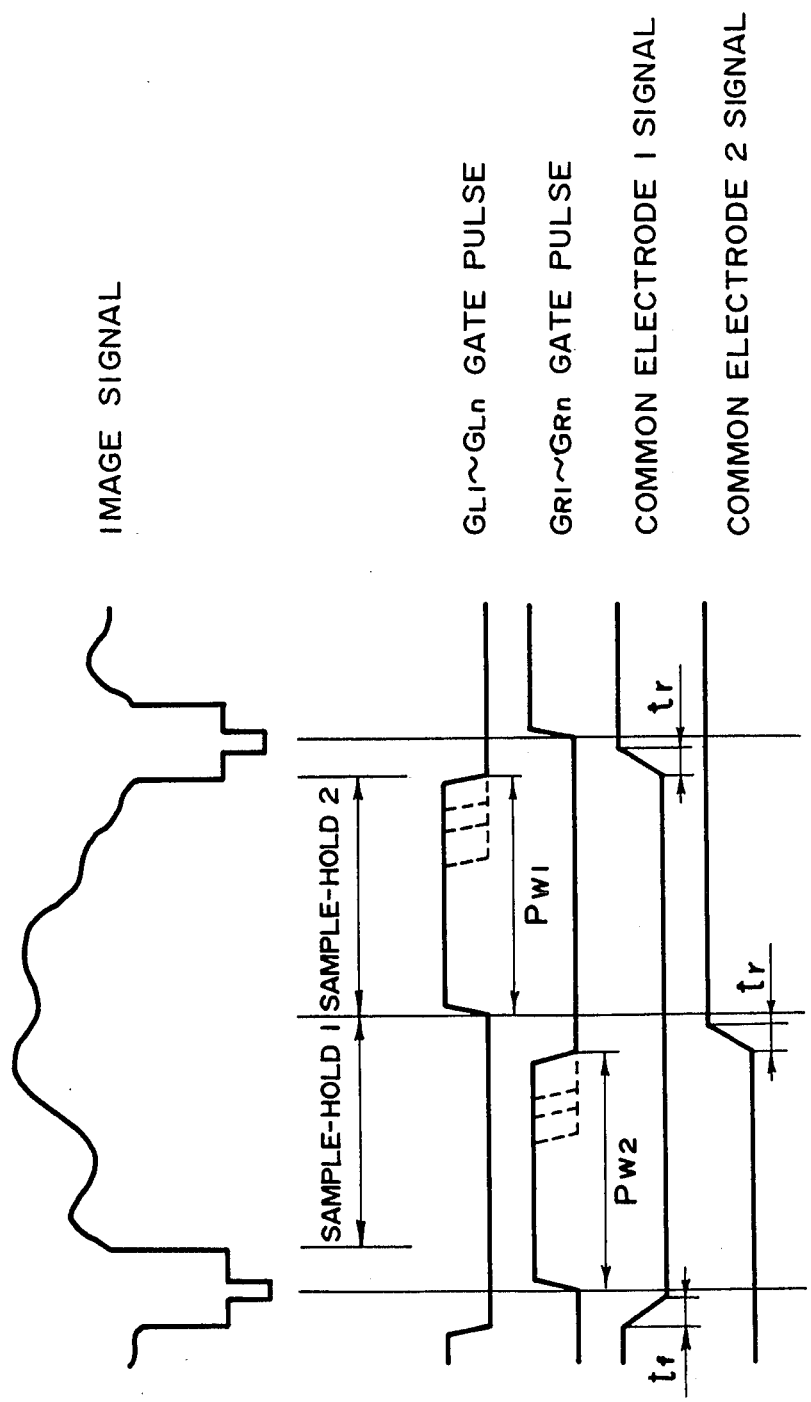
FIG. 2 is a time chart for the operation of the embodiment of FIG. 1.

FIG. 2 is a timing chart showing an example of the operation of the liquid crystal display panel having the foregoing peripheral circuits. In FIG. 2, the image signal is the NTSC signal as one of the television system. Sample-hold 1 and 2 denote intervals to sample and hold into the capacitors the image signal which is input to the pixels connected to the first and second gate lines, respectively. $P_{W1}$ and $P_{W2}$ indicate the widths of the gate pulses which are applied to the first and second gate lines. The common electrode 1 signal and common electrode 2 signal are supplied to the common electrodes corresponding to the first and second gate lines, respectively. In FIG. 2, $t_f$ and $t_r$ denote trailing time and leading time of the common electrodes, respectively.

As shown in FIG. 2, by dividing the gate lines into the first and second gate lines, the gate pulse widths $P_{W1}$ and $P_{W2}$ can be widened from within the conventional horizontal blanking interval to the time duration of about ½ of the other image signal sample/hold interval, namely, one horizontal scanning interval. These widths are about three times as long as the conventional ones. Even in the case of applying the voltage to the opposite common electrodes, the limitation of the times $t_r$ and $t_f$ which are required to invert the polarity is lightened because of the foregoing reasons. In other words, although the interval of $P_W + t_r$ or $P_W + t_f$ is limited to an interval within the horizontal blanking interval, it is sufficient to take the time of about ½ of one horizontal scanning interval. The image signal held in the capacitors $C_1$ to $C_{2m}$ is sufficiently transferred to the liquid crystal cells. The lack of luminance and the variation in luminance in association with the variation in characteristics of the TFT and with the realization of a large area and a high fine pitch of the panel are not caused and an excellent display quality can be obtained. In addition, the display panel is divided into the first and second pixel groups and each pixel gourp is respectively driven by the independent driving circuits. Therefore, the limitation of the driving timing is also lightened and there is also the advantage such that the burden for the driving capability of the driving circuit is also reduced.

In the above embodiment, the NTSC signal has been described as an example. However, the invention is also effective in the case of displaying characters or the like by use of a frame memory or the like.

As described above, according to the invention, a group of pixels of the display panel and its gate lines are divided and the gate pulse widths upon driving are widened. Thus, even if the area of the active matrix type liquid crystal display panel is enlarged and the pitch of this panel is greatly refined, the lack of luminance and the variation in luminance are not caused, and the image with a high quality can be displayed.

What we claim is:

1. A display apparatus, comprising:

(A) a matrix display panel including an active matrix base plate, said active matrix base plate further comprising, a first group of transistors arranged along a row and a column, and a second group of transistors arranged along the row and the column, wherein said first group of transistors arranged along the row is commonly connected to a gate line for each row, and said first group of transistors arranged along the column is commonly connected to a source line for each column, and wherein said second group of transistors arranged along the row is commonly connected to a second gate line for each row, and said second group of transistors arranged along the column is commonly connected to a source line for each column;

(B) first drive means, further comprising, a first scan pulse generation circuit connected to the gate line to which said first group of transistors is connected for each row, and a second scan pulse generation circuit connected to the second gate line to which said second group of transistors is connected for each row, wherein scan pulses are alternatively generated from said first and second scan pulse generation circuits; and (C) second drive means, further comprising:

a first data output circuit connected to the source line to which said first group of transistors is connected for each column, and a second data output circuit connected to the source line to which said second group of transistors is connected for each column, wherein data pulses are alternately generated from said first and second data output circuits in synchronism with generation of the scan pulses.

2. A display apparatus according to claim 1, wherein said first data output circuit and said second data output circuit respectively comprise sample-and-hold circuits for alternately sampling and holding input data.

3. A display apparatus according to claim 1, wherein said first and second data output circuits respectively comprise sample-and-hold circuits for alternately sampling and holding input data, and further comprising a circuit in which, while one of said data output circuits samples and holds the input data, the other of said data output circuits outputs the sampled and held data.

4. A dispaly apparatus according to claim 1, wherein said first group of transistors and said second group of transistors are respectively divided into right and left regions on a display screen.

5. A display apparatus according to claim 1, wherein said transistor includes a thin film transistor.

* * * * *

UNITED STATES PATENT AND TRADEMARK OFFICE
CERTIFICATE OF CORRECTION

PATENT NO. : 4,779,085

DATED : October 18, 1988

INVENTOR(S) : Atsushi Mizutome, et al

It is certified that error appears in the above-identified patent and that said Letters Patent is hereby corrected as shown below:

Column 1, line 16, "twodimensional" should read --two-dimensional--.

Signed and Sealed this

First Day of August, 1989

Attest:

DONALD J. QUIGG

Attesting Officer

Commissioner of Patents and Trademarks